United States Patent [19]

Sparham et al.

[11] 3,923,649
[45] Dec. 2, 1975

[54] FLOATING CLARIFIER MECHANISM AND METHOD
[75] Inventors: Vaughan R. Sparham, Bournemouth, England; Leon C. Bixby, Clark's Green, Pa.
[73] Assignee: Hendrick Manufacturing Company, Carbondale, Pa.
[22] Filed: Feb. 22, 1974
[21] Appl. No.: 444,706

[52] U.S. Cl. .................................. 210/20; 210/242
[51] Int. Cl.² .......................................... B01D 35/00
[58] Field of Search .......... 210/20, 170, 242, 65, 83

[56] References Cited
UNITED STATES PATENTS

| 1,591,923 | 7/1926 | Lebherz | 210/242 |
|---|---|---|---|
| 2,272,026 | 2/1942 | Spaulding | 210/20 |
| 2,620,926 | 12/1952 | Helbug | 210/20 |
| 3,223,243 | 12/1965 | Muller | 210/242 |
| 3,303,932 | 2/1967 | Hirs | 210/242 |
| 3,313,725 | 4/1967 | Koh Tsuda | 210/20 |
| 3,374,893 | 3/1968 | Strelton | 210/242 |
| 3,402,817 | 9/1968 | Dovel | 210/242 |
| 3,403,076 | 9/1968 | Mackile | 210/20 |
| 3,547,811 | 12/1970 | McWhirter | 210/242 |
| 3,653,641 | 4/1972 | Eron | 210/242 |

Primary Examiner—Charles N. Hart
Assistant Examiner—Ernest G. Therkorn
Attorney, Agent, or Firm—Dybvig & Dybvig

[57] ABSTRACT

Bouyant means float and at least partially submerge a vertically disposed clarifier duct, open at its upper and lower ends, at the surface of a body of water to be clarified. Breakwater means associated with the clarifier duct prevent an overflow of water from the body of water to be clarified into the floating clarifier duct. A decanter means continuously withdraws water from said duct at a level below that of the surrounding water to be clarified thus emabling a continuous upflow of water in said duct, the water entering the lower end of said duct and rising upwardly until withdrawn by said decanter means. Clarifier means integral with or disposed within said duct induce the formation of a sludge blanket within said duct below the level at which said decanter means withdraws water from said duct whereby the continuous upflow of water through said duct entraps impurities contained in the upflowing water in said sludge blanket.

26 Claims, 10 Drawing Figures

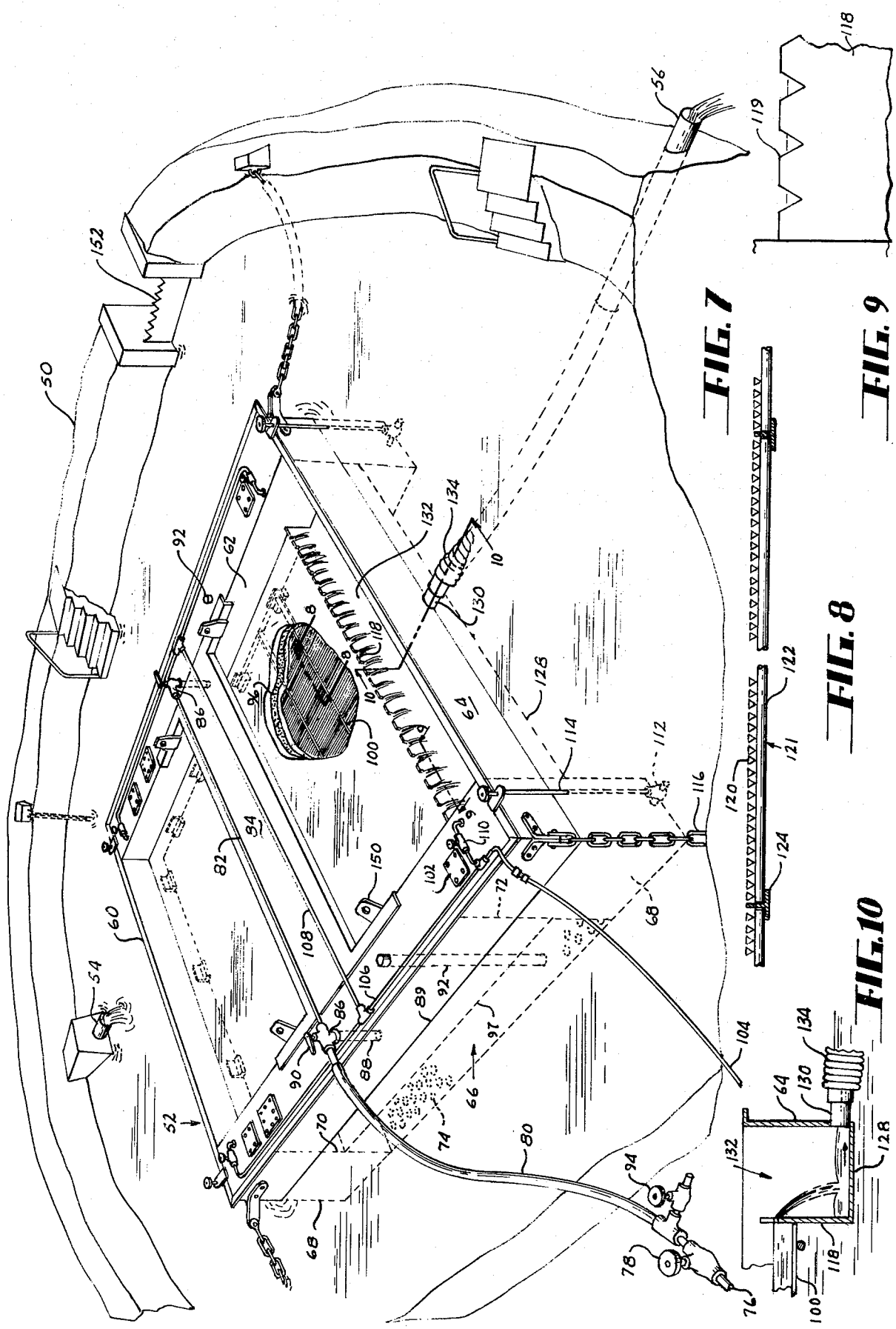

ced) 3,923,649

FLOATING CLARIFIER MECHANISM AND METHOD

BACKGROUND OF THE INVENTION

1. Field of the Invention

This invention relates to tertiary water treatment apparatus utilizing upflow clarification to remove essentially colloidal matter from sewage water that has already been secondarily treated. However, the invention is not necessarily so limited.

2. Description of the Prior Art

The following patents are representative of prior art utilizing upward flow clarification and related techniques for the purification of water: 1,189,114; 1,398,285; 1,738,521; 2,021,672; 2,223,258; 2,425,372; 2,559,462; 2,273,231; 2,767,847; 2,938,867; 2,948,400; 3,152,071; 3,313,725; 3,307,702; 3,398,089; 3,399,135; 3,403,096; 3,408,288; 3,419,491; 3,433,359; 3,433,360; 3,481,868; 3,511,380; 3,524,810; 3,545,619; 3,630,377; 3,642,134; 3,713,543; Re. 24219.

SUMMARY OF THE INVENTION

Tertiary clarifier devices, as presently known and used, are normally sized to receive the maximum flow or output from a secondary treatment facility. This means that the tertiary treating devices are normally larger than would be required to accept the average flow of water from the secondary facility being served. In accordance with the present invention, it has been found possible to utilize tertiary treatment devices sized only to accept the average, not the maximum, flow from a secondary treatment facility. This is accomplished by providing a pond or lagoon in which the output of a secondary treatment facility can be accumulated and by floating in the lagoon a tertiary treatment mechanism sized only to accommodate the average output of the secondary treatment facility being served. In the preferred embodiment of this invention, the tertiary treatment device includes an upflow clarifier. The preferred type of clarifier utilized in this invention is of the type having a porous or foraminous septum, the septum being assembled in a suitable duct means, open at both ends, which is floated in a vertically disposed position on the water to be clarified. By a suitable application of hydraulic principles, a continuous upflow of water through the septum is sustained with the result that colloidal sewage impurities in the water coagulate in the region above the septum so as to form a sludge blanket.

The continuous upflow of water through the septum is sustained by continuously withdrawing or decanting the clarified water which has risen above the forementioned sludge blanket, the withdrawal of water occurring at a level below that of the surrounding water in the pond or lagoon. Since the clarifier mechanism is floated on the pond or lagoon, the clarifier mechanism is free to rise and fall as the level of the water in the lagoon changes and is thus not adversely affected by changes in the output of the secondary treatment system which is being served by the lagoon. As will be explained, the operating speed of the clarifier mechanism is determined by the level at which it floats with respect to the surrounding water in the lagoon and for this reason the operating speed of the clarifier mechanism is maintained constant over a wide range irrespective of the level of water in the pond or lagoon.

The means floating the clarifier mechanism is preferably a means of variable bouyancy such that the level at which the clarifier mechanism floats is adjustable thus to enable a periodic backwashing of the sludge blanket formed above the clarifier septum.

An object of the present invention is to provide an improved mechanism for the removal of impurities from water or other liquids.

A further object of the present invention is to provide an improved mechanism for purifying water which mechanism can be floated upon a lagoon or pond so as to have constant operating characteristics over a wide range without regard to the level of water in the pond or lagoon.

Other objects and advantages reside in the construction of parts, the combination thereof, the method of manufacture and the mode of operation, as will become more apparent from the following description.

BRIEF DESCRIPTION OF THE DRAWINGS

FIG. 7 is a perspective view illustrating a fifth modification in its operating environment.

FIG. 8 is a section view taken substantially along a line 8—8 of FIG. 7.

FIG. 9 is an enlarged view of the region designated by the line 9—9 of FIG. 7.

FIG. 10 is a fragmentary section view taken substantially along the line 10—10 of FIG. 7.

DESCRIPTION OF THE PREFERRED EMBODIMENT

FIGS. 1 through 6 in the present application are presented for the purpose of affording a simplified description of the manner in which the present invention operates.

Figure 1:
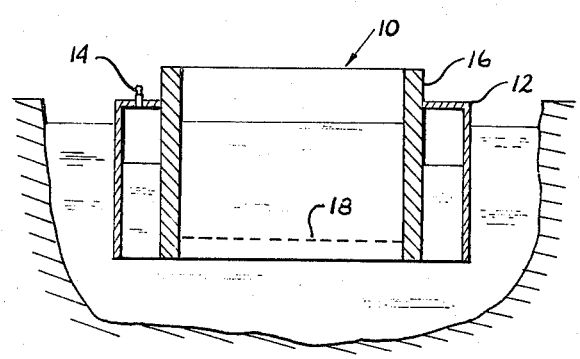
FIG. 1 is a section view schematically illustrating a clarifier device floated upon a body of water.

FIG. 1 schematically illustrates an annular duct 10 encircled by a buoyant means 12 which floats the duct on a body of water such as resides in a pond, basin, lagoon, or the like. The buoyant means 12 merely encloses a volume of water adjacent to or surrounding the duct 10. Valve means 14 communicating through the top of the buoyant means 12 is used to inject air above the water in the buoyant means thus to displace water from the buoyant means and to float the duct 10. The duct is so floated that an upper portion thereof projects above the surface of the water in which it is floated so as to form a breakwater 16 preventing the overflow of surface water into the duct 10.

The duct 10 is partitioned by a horizontally disposed septum 18 which is sufficiently porous or foraminous to permit the passage therethrough of secondarily treated water together with any particulate debris carried thereby. Accordingly, the septum does not behave as a filter and will not become occluded by particulate matter flowing with the water.

As shown in FIG. 1, the water within the duct 10 has risen to the same level as the surrounding water and, even though the clarifier means is floating, no upward water flow is being sustained.

As will be more fully explained in a later portion of this description, a septum 18 of the type described is effective to induce the formation of a sludge blanket thereabove if a rate of upflow of water through the septum is sustained at an operative level. A typical operative level is an upward flow rate of 25 gallons of water per square foot of septum per hour.

Figure 2:
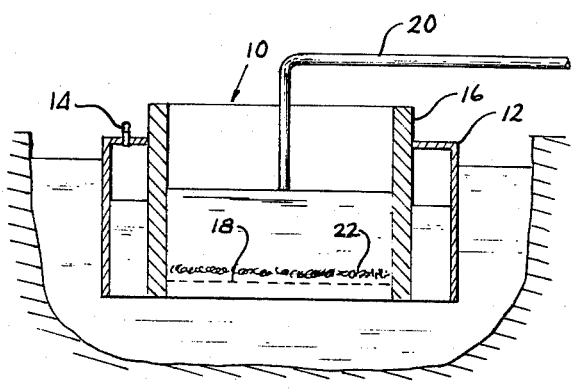
FIG. 2 is a section view illustrating schematically the same floating clarifier device with water being siphoned therefrom.

As shown in FIG. 2, such an upward flow rate can be readily established by immersing a decanter hose 20 in the upper part of the water within the duct 10 and, by means of a pump or a siphon, removing water from within the duct 10 at the rate of 25 gallons per hour per square foot of septum. Due to such removal, the level of the water within the duct 10 will drop below the level of the surrounding water as shown in FIG. 2. Also, as a result of such removal, and assuming the presence of small particle sewage impurities in the pond or lagoon on which the clarifier has been floated, the continuous removal of water from within the duct 10 will quickly induce the formation of a visible sludge blanket 22 directly above the septum. This sludge blanket comprises small particles, some of colloidal size, which have escaped settlement during secondary sewage treatment and which agglomerate in and above the septum.

As apparent in FIG. 2, it is important that the septum be located a substantial distance below the opening into the siphon hose 20 so that the lateral flow of water into the hose 20 at the opening thereto will not sweep the blanket 22 from the interior of the duct 10.

The equilibrium level of water within the duct 10 which results from the continuous removal of 25 gallons of water per square foot of septum per hour can now be measured in reference to the level of the surrounding water so as to measure the hydraulic head which is required to sustain a continuous upflow of water through the septum at the desired rate of 25 gallons per square foot per hour.

Figure 3:
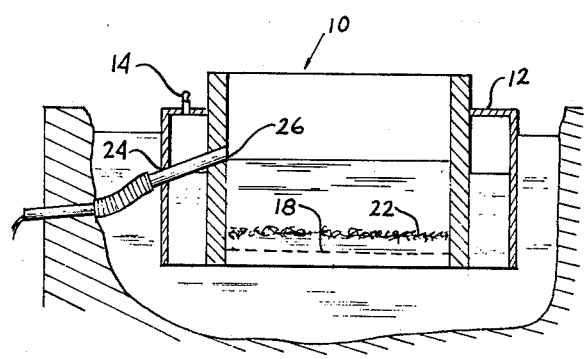
FIG. 3 is a section view of a first modification.

Those skilled in the art will immediately recognize that the pump or siphon, not shown, but associated with the hose 20 can now be eliminated. Thus, all that is necessary is the creation of an outlet drainage passage 24 as shown in FIG. 3 which will drain water over its lower edge or weir 26 from within the duct 10 at the equillibrium level determined by siphoning as shown in FIG. 2, and discharge the water remotely to a level lower than the aforementioned equillibrium level.

Here, again, it is important that the septum 18 be located a substantial distance below the outlet drainage passage 24 so as to prevent disruption of the blanket 22. Furthermore, it is important that the size of the opening to the drainage passage be adequate to freely accept the water up-flowing the duct 10. Assuming these conditions, a continuous drainage of water from the duct 10 downwardly through the passage 24 will result in the continuous upflow of water through the septum 18 at the rate of 25 gallons per square foot of septum per hour.

Figure 4:
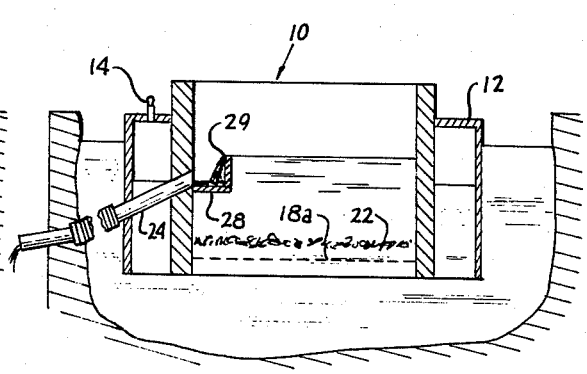
FIG. 4 is a section view of a second modification.

As shown in FIG. 4, it is not essential that a porous septum form the complete partition for the duct 10. Rather, the partition for the duct 10 can be in two parts, one part being a porous septum 18a and the remainder being an imperforate collector tray 28 equipped with an upstanding weir 29 which separates the septum from the collector tray 28. Since the collector tray 28 is imperforate, the effective area of the duct 10 has been reduced to an area coinciding with the area of the septum 18a. In other words, the weir forms part of a new and smaller duct within the larger duct 10, and the smaller duct is fully partitioned by the septum 18a.

In using the device of FIG. 4, water to be treated will upflow the septum 18a, rise to the upper surface of the weir 29, and ultimately overflow the weir 29 to reach the collector tray 28 from which the clarified water reaching the tray can be decanted or drained by any suitable means. As water upflows the septum 18a, a sludge blanket 22 forms above the septum but below the level of the weir 29. The lateral flow of water over the weir, if excessive, will tend to be disruptive of the blanket 22 and to prevent such disruption, the septum 18a is located a substantial distance below the weir. In general, the level at which the blanket forms below the weir is not a critical factor if the length of the weir is sufficient to limit the water overflowing the weir to the range 500 to 600 gallons per hour per lineal foot of weir.

With reference to the structure illustrated in FIG. 4, it will be noted that the collector tray 28 is part of a drainage passage and the elevation of the collector tray 28, as long as it is at or below the upper surface of the weir 29, is unimportant.

Figure 5:
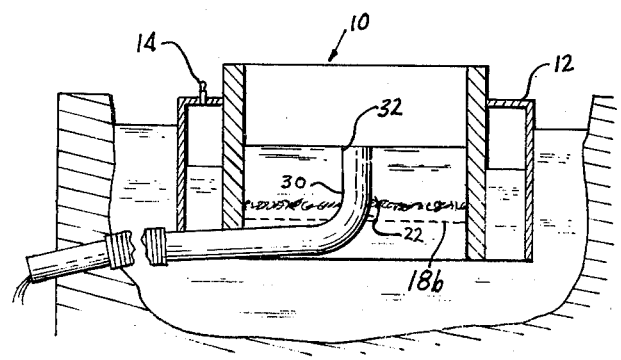
FIG. 5 is a section view illustrating schematically a third modification of the clarifier device.

FIG. 4 perhaps erroneously implies that the collector tray 28, if one is used, must be adjacent a wall of the duct 10. FIG. 5 illustrates, however, that the collector means may, if desired, be located anywhere within the duct 10 and in particular may be located at the center of the duct 10. Thus FIG. 5 shows an annular septum 18b surrounding the upper end of a drainage pipe 30, the drainage pipe 30 communicating downwardly and outwardly of the duct 10 to any suitable remote location.

Upon the upflow of water through the septum 18b to the level of the upper end of the pipe 30, which serves as a weir 32, water will be decanted from the duct 10 through the pipe 30. In this case the rate of upward flow will be determined by the surface area of the septum 18b and by the difference in elevation between the weir 32 and the surrounding water in which the duct 10 has been floated.

As shown in FIG. 5, it is desirable that the septum 18b be located well below the level of the weir 32 so that the blanket is not disrupted by the lateral flow of water into the drainage pipe 30. Alternately, the drainage pipe may be so sized in relation to the interior diminsions of the duct 10 that the weir speed is adequately low to prevent disruption of the blanket 22.

Figure 6:
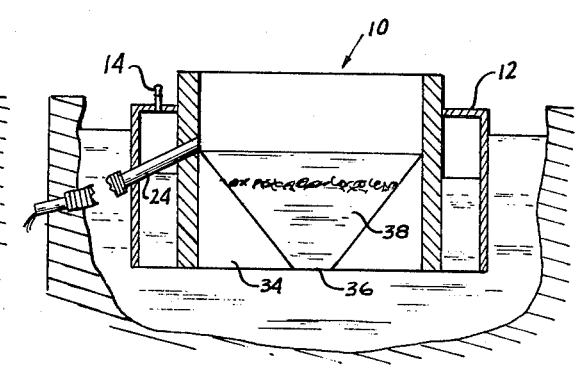
FIG. 6 is a section view schematically illustrating a fourth modification of the clarifier device.

The foregoing description regarding FIGS. 1 through 5 may create the impression that a septum is a necessary element of the present invention. FIG. 6 has been presented for the purpose of illustrating that upward flow clarifier configurations exist in which a septum is not a necessary component. In FIG. 6, the duct 10 has been restricted with a downwardly convergent conical annulus 34 in such fashion that the duct has a relatively small opening 36 in its lower portion and an upwardly divergent chamber 38 rising above the opening 36. A drain passage 24 allows a continuous upflow of water through the chamber 38. As water upflows through the opening 36, the water advances upwardly in the chamber 38 at a continuously decelerating rate by reason of the increasing diameter of the chamber 38. Such deceleration movement leads to the production of a sludge blanket in the chamber 38 and this sludge blanket effectively entraps impurities, thus clarifying the water up-flowing in the chamber 38. The clarifier is, of course, so designed that sludge blanket formation occurs below the level at which the drain passage 24 enters the duct 10.

The construction and operation of the embodiments shown in FIGS. 1 through 6 can be summarized as follows. An upward flow blanket inducing clarifier is surrounded by a duct means. The clarifier and its surrounding duct means are so floated by attachment to a buoyant means that both the clarifier and the lower end of the duct means are submerged below the level of the surrounding water. An outlet passage permits water which upflows the clarifier to escape the duct means over a weir disposed above the clarifier and above the blanket produced thereby, but below the level of the surrounding water. The outlet passage discharges remotely to a level lower than the weir level and thus allows a continuous upflow of water through the clarifier. The weir level is disposed above the clarifier a sufficient distance to allow blanket formation in or above the clarifier before the clarified water is permitted to escape the duct means through the outlet passage. The upper end of the duct means or a portion attached thereto serves as a breakwater to prevent an overflow of surrounding water into the upper end of the duct means.

FIG. 7 illustrates a water purification apparatus in which various of the design and operating principles discussed in connection with FIGS. 1 through 6 have been embodied. Secondarily treated sewage is accumulated in a basin or pond 50. An upward flow clarifier apparatus 52 is floated upon the water accumulated in the pond. An inlet duct 54 communicating with a secondary sewage treatment facility, not shown, discharges effluent from the secondary facility into the pond 50.

Except for unusual circumstances to be described, the only outlet from the pond 50 is a discharge duct 56 through which clarified water is discharged. The only means by which water can reach the duct 56 is by upward flow through a septum 100 supported in the floating apparatus 52.

The floating apparatus 52 has a construction functionally similar to that schematically illustrated in FIG. 4. The apparatus comprises a rectangular frame 60 having an interior generally vertical wall 62. The frame 60 also has a rectangular outer wall 64 which serves as a breakwater for preventing water located in the pond 50 from splashing into the center area of the frame 60.

Between the inner wall 62 and the outer wall 64 along each of the larger sides of the frame 60, there is provided a chamber 66. The two diametrically opposite chambers 66 are used to float the frame 60 at a predetermined level with respect to the surface of the surrounding water in the pond 50. Flanking the chambers 66 on each longer side of the frame 60 are ballast tanks 68. The ballast tanks are used to balance the frame 60 so that it floats in an attitude which is nearly exactly horizontal.

Each chamber 66 has an appreciable vertical height and extends horizontally between walls 70 and 72 which form water-tight partitions between the chamber 66 and its flanking ballast tanks 68.

Air under pressure is made available to the frame 60 from a suitable land based source, not shown, through a supply line 76. The delivery of air from the supply line 76 is controlled by a valve 78. A flexible air line 80 communicates from the valve 78 to an air delivery pipe 82 mounted over a bridge 84 extending between the longer sides of the frame 60.

Coupled to the pipe 82 at opposite ends of the bridge 84 are stopper valves 86. Descending from each of the stopper valves 86 is a pipe 88 which can be selectively closed by its overlying stopper valve 86. The pipes 88 terminate within the chambers 66 on each side of the frame 60 at a predetermined level within the frame.

The stopper valves 86 each have an operating lever 90. When the levers are positioned horizontally as shown in FIG. 7, the stopper valves 86 are disabled and air is permitted to move freely from the flexible pipe 80, through the length of the pipe 82, and into each of the downwardly extending pipes 88. Should valve 78 be opened, the frame 60 will rise due to the displacement of water from the chambers 66 at the opposite sides of the frames 60. The valve 78 thus provides a means to increase the elevation at which the frame 60 will float on the pond 50.

An upper limit to the elevation at which the frame 60 can float is established by means of vertically disposed pipes 92, there being one in each of the chambers 66. Each of the pipes 92 is unobstructed along its length and each of the pipes 92 extends downwardly from a position above the frame 60 to a lower position which is just above an underlying perforated plate 74. Assuming the valve 78 would be opened and unattended, a continued displacement of water from the chambers 66 would cause the frame to rise until the pipes 92 on each longer side of the frame 60 rise above the level of the surrounding water, whereupon the displacement of water from the frame 60 would terminate by reason of the escape of air upwardly through the pipes 92. As soon thereafter as the valve 78 would be closed, the frame 60 would settle down only so far as required for water to plug the pipes 92 by the entry of water into the lower ends of such pipes.

In order to lower the frame 60 from its upper level established by the pipes 92, it is necessary to withdraw air from within the chambers 66. Such withdrawal is accomplished by means of a valve 94 which can be opened to discharge air from the pipes 80 and 82. However, before the valve 94 is opened for the purpose of lowering the frame 60, the valve 78 is first closed. When the valve 94 is opened, air escapes from the chamber 66 on each side of the frame 60 through the pipes 88, the pipe 80 and the outlet provided by the valve 94. The frame will then settle to the level at which the water will plug the pipes 88. This level is indicated in FIG. 7 by the broken line 97 and is a level below the surrounding pond level 89.

The stopper valves 86 allow stoppage of the pipes 88 should it be desired to stop the frame 60 at a float elevation intermediate the upper and lower limits set by the pipes 92 and 88.

The ballast tanks 68 are located in the four corners of the frame 60. Each of the tanks 68 has an accompanying access window which is normally closed by a plate 102. Associated with each of the chambers 68 near the bottom thereof is a cock 112, having an operator 114 extending upwardly for manipulation at a position near the upper surface of the frame 60. In operation, each of the tanks 68 is initially partially filled with water by opening its cock 112. A second source of air under preferably a greater pressure than supplied to the line 76 is provided to the frame 60 through a supply line 104, the supply line 104 being connected by pipe elements 106 and 108 to each of the four corners of the frame 60 where the air supply is regulated by a valve 110. The valves 110, there being one such valve in each corner of the frame 60, are initially opened to supply a charge of air under pressure above the water in each of the tanks 68.

Should it be that the frame 60 does not float horizontally, the corner of the frame that dips most deeply into the water can be floated to a higher level by releasing the cock 112 at that corner to permit a discharge of water from the chamber 68 at that corner. Obviously, by a minipulation of the operators 114, the attitude of the frame 60 may be adjusted to be horizontal to near perfection. As shown, the four corners of the frame 60 may also be restrained to a permissable range of migration along the surface of the pond 50 by means of tethers 116.

Extending across the frame 60 adjacent one of the shorter sides thereof is a weir 118 which, as shown in FIG. 9, has triangular notches 119 along its uppermost edge. The triangular notches minimize surface tension effects along the upper edge of the weir. The septum 100 extends horizontally from the weir 118 to the opposite end of the frame 60. As shown in FIG. 8, the septum 100 comprises closely spaced triangular wire elements 120 affixed by any suitable means such as welding or looping to transverse support rods 122. As also indicated in FIG. 8, the septum is assembled in conveniently small sections or panels 121 mounted upon underlying structural members or joists 124. The joists 124 are supported by the interior wall of the frame 60.

It is preferred that the triangular wire elements 120 be spaced apart between their confronting apices a distance which is in the range 0.125 to 1.25 millimeters. It is also preferred that all of the wires 120 in each of the separate sections 121 be parallel one to the other but it is not important that the wires in one section extend parallel to the wires in the next adjacent section. It is not important whether the wires 120 be parallel or antiparallel to the weir 118.

The frame 60 has hoisting lugs 150 affixed thereto at suitable locations to allow the entire clarifier apparatus to be raised upwardly for installation by lowering the apparatus gently onto the pond 50. For such installation the stopper valves 90 are positioned to close their descending pipes 88. With the valve 94 open and the valve 78 closed, the apparatus will settle to the position established by the pipes 88 as it is lowered into the pond 50.

Clarifier operation will proceed automatically by reason of the hydraulic forces that drive the water from the pond upwardly through the septum 100.

For proper operation of the apparatus 52, it is necessary of course that the floating elevation of the frame 60, as controlled by the pipes 88 or the stopper valves 86, place at least the apices of the notches 119 in the weir 118 below the surface of the water surrounding the frame 60. It is further important that the construction of the apparatus 52 be such that the septum 100 is disposed at least a few inches below the level of the notches 119 and thus below the water retained above the septum 100 by reason of the weir 118.

Since both the septum 100 and the weir notches 119 are below the level of the surrounding water, water from the pond 50 will be hydraulically driven upwardly through the septum and caused to overflow the weir 118. As appears in FIG. 10, the space between the weir 118 and the adjacent end of the frame 60 is closed by an imperforate plate 128 which cooperates with the weir 118 and the wall 62 to form a collecting chamber 132 to receive the water overflowing the weir 118. Water collected in the chamber 132 is decanted by means of a duct 130 communicating to the chamber 132 through the walls 62 and 64 of the frame 60. The duct 130 is connected by a flexible hose 134 to the forementioned discharge duct 56.

From the foregoing description it can be noted that the preferred embodiment of FIG. 7 is analogous in function to the schematically illustrated structure of FIG. 4. Thus the weir 118 and the frame 60 cooperate to form a duct means surrounding a septum through which water flows upwardly, while the weir 118 cooperates with one end of the frame 60 to provide a collector tray from which clarified water is decanted through the duct 130.

At the preferred flotation level for the frame 60, the rate of flow of water through the outlet 56 will be at the approximate rate of 25 gallons per square foot of septum per hour. This rate is in the desired range for a septum of the type described but is obviously variable to meet the conditions of the secondary sewage effluent being treated. As an upward flow of water through the septum 100 continues, a flimsy sludge blanket 96 which may not be initially visible will very promptly form below the weir 118 and an inch or so above the septum 100. The sludge blanket is shown schematically by means of a cut away in FIG. 7. Ordinarily, the sludge blanket becomes clearly visible after only an hour or so of operation. After prolonged operation, such as one day, the sludge blanket can become quite dense and in time will present a substantial resistance to a continued upward flow of water through the sludge blanket. In order to prevent breakage of the sludge blanket into fragments which may overflow the weir 118, the preferred mode of operation includes a periodic, such as daily, opening of the valve 78 so as to raise the frame 60 to the level determined by the pipes 92. As the frame 60 is thus raised, the septum 100 moves upward through the sludge blanket and, due to the weight of water overlying the sludge blanket, the sludge blanket is washed downwardly through the septum 100. The frame 60 is thereafter promptly lowered by a closure of the valve 78 and an opening of the valve 94.

The sludge blanket develops due to a coagulation of colloidal particles carried from the secondary treatment facility into the pond 50. While the colloidal particles entering the pond 50 have escaped previous opportunity to settle, the mechanical coagulation of such particles above the septum 100 has rendered them settleable. Thus, after the septum 100 is lifted through the sludge blanket, the contents of the blanket will settle downwardly below the septum to the base of the pond 50. Conventional means such as a drainage tap, not shown, but located at the base of the pond 50, may be opened at periodic intervals, such as monthly intervals, to drain this settled sludge from the base of the pond 50.

The present invention offers a number of unique advantages. Since the frame 60 is floated, the apparatus is capable of maintaining an exceptionally constant upward flow of water through the septum 100 over a wide range of water accumulations within the pond 50. This means that the pond 50 can be sized to accept all discharge from a secondary sewage treatment facility without interrupting or disturbing the constant rate of upward water through the septum 100. As the water level in the pond 50 rises, the frame 60 rises with the pond level. As the accumulation of water in the pond 50 diminishes the frame 60 settles accordingly.

While the operation of the apparatus of the present invention can tolerate wide variations in the accumulation of water in the pond 50, there are practical limits. Should the effective level of the weir 118 subside below the level of the outlet 56 there will be no gravitational force effective to drive the water collected in the chamber 132 to the outlet 56 and the discharge of water to the outlet 56 will cease.

It has previously been mentioned that the apparatus of the present invention as shown in FIG. 7 can be sized to accept the average flow of effluent from the secondary treatment facility being served. One can imagine, however, an unexpectedly large demand upon the pond 50, such as may result during storm conditions, and an accumulation in the pond sufficient to back water into the inlet duct 54. In anticipation of such an occurrance, a weir 152 is provided at any suitable location in the side wall or bank of the pond 50 to allow a diversion of water which would otherwise back into the duct 54 to a suitable reservoir, not shown. The elevation of the weir 152 is so chosen with respect to the inlet 54 to minimize damage to the secondary treatment facility that might otherwise result from a backup from the pond 50 to the secondary treatment facility.

Another advantage to the present invention is that the baskwashing operation can be completed without interruption to the operation of the secondary treatment facility being served and without overloading the tertiary treatment system.

Furthermore, since the septum 100 is raised upwardly through its blanket and above the level of the surrounding water of the pond for baskwashing there is no danger that the backwashing operation will result in a discharge of sludge from the blanket to the outlet 56. Thus, even though backwashing will occur periodically, only clarified water reaches outlet 56.

Still another advantage resides in the fact that the floating clarifier can be adapted for use in any existing pond or lagoon without disturbance to existing facilities and without interruption of the flow through the secondary treatment plant to be served.

Further advantages reside in the fact that the apparatus, being floated, requires no structural support although tethering may be used as desired. Also, the apparatus may be floated with its own power supply mounted thereon, or, as shown in the drawing, with hose connections to a land based air supply.

Although the presently preferred embodiments of this invention have been described, it will be understood that various changes may be made within the scope of the appended claims.

Having thus described our invention, we claim:

1. A method of clarifying water which comprises: accumulating water to be clarified in a basin, floating a blanket inducing upflow clarifier means with an opening thereto submerged in the accumulated water, and decanting water from said clarifier means at a level above the induced blanket and below the level of surrounding water in the basin.

2. The method of clarifying water which comprises the steps of accumulating water to be clarified in a basin, floating a blanket inducing upflow clarifier means with an opening thereto submerged in said accumulated water, decanting water from said clarifier means at a level above said opening and below the level of the surrounding water in said basin to induce blanket formation in said clarifier means and thereafter raising the level of flotation of said clarifier means to lift said clarifier means through blanket material formed therein.

3. Water treatment apparatus comprising, in combination, annular duct means having spaced apart end portions, upward flow clarifier means disposed within said duct means and spaced from one end portion thereof for inducing coagulation of suspended solids as a blanket in the space between said clarifier means and said one end portion, buoyant means attached to said duct means and adapted to float said duct means on a body of water, said buoyant means adapted, when floating said duct means, to support said duct means with the other end portion of said duct means and said clarifier means disposed below the level of surrounding water, and decant means for removing water upflowing said duct means at a level above said clarifier means and below the level of the surrounding water without disruption of the blanket induced by said clarifier means.

4. The apparatus of claim 1 wherein said clarifier means comprises a foraminous septum supported in and at least partially partitioning said duct means in spaced relation to said one end portion, said septum, when said duct means is floated, permitting an upflow of water therethrough toward said one end of said duct means.

5. The apparatus in claim 1 wherein said decant means comprises means to siphon water from said one end portion of said duct means.

6. The apparatus of claim 1 wherein said decant means comprises outlet passage means communicating to said duct means in the space between said clarifier and said one end portion.

7. The apparatus of claim 6 wherein said outlet passage means includes a weir spaced above said clarifier means when said duct means is floated.

8. The apparatus of claim 1 wherein said buoyant means comprises an annular frame, said duct means disposed within said annular frame, said decant means disposed within said annular frame adjacent said duct means and cooperating with said duct means to partition the interior of said annular frame.

9. The apparatus of claim 8 wherein said annular frame has an inner wall and an outer wall defining a chamber therebetween, and including means to displace air from said chamber.

10. The apparatus of claim 1 wherein said one end of said duct means comprises a breakwater to shield the interior of said duct means from an overflow of the water in which the duct means is to be floated.

11. The apparatus of claim 1 including means to adjust the buoyancy of said buoyant means thus to adjust the level at which said buoyant means, when floating said duct means, supports said duct means and said clarifier means with respect to the level of surrounding water.

12. A water treatment apparatus comprising means including an upflow clarifier septum for inducing coagulation as a blanket of solids suspended in water upflowing the septum, an overflow weir adjacent said septum, said weir projecting above the level at which said solids coagulate as a blanket, a collection chamber separated from said septum by said weir, buoyant frame means floating the septum, weir, and collection chamber on a body of water, said frame means supporting said weir below the level of water surrounding said frame means, said frame means supporting said septum below the level of said weir whereby solids carried in water upflowing said septum coagulate as a blanket below the level of said weir.

13. The apparatus of claim 12 including decant means communicating with said collection chamber to drain water from said collection chamber remotely from the body of water on which the apparatus is floated.

14. The apparatus of claim 12 wherein said frame means has an interior wall surrounding the septum, weir, and collection means and has an exterior wall cooperating with said interior wall to provide at least one flotation chamber in communication with said body of water, said apparatus including air pressure supply means communicating with said flotation chamber to displace water therefrom, said air pressure supply means including a first depending pipe affixed to said frame means and disposed within said flotation chamber, said air pressure supply means including normally closed exhaust means which, when opened, permits air to escape said flotation chamber through said first pipe until said frame means settles to a level at which water within said flotation chamber closes said first pipe.

15. The apparatus of claim 14 including a second pipe affixed to said frame means and depending within said flotation chamber, said second pipe communicating to the atmosphere above said chamber, said second pipe projecting downwardly in said chamber to a level lower than said first pipe, said second pipe limiting the displacement of water from said chamber by permitting the escape of air to the atmosphere upon the displacement of water in said chamber below the level of said second pipe.

16. The apparatus of claim 14 wherein said frame means includes a ballast tank adapted to be charged with water and with air under pressure, said apparatus including means for discharging water from said ballast tank.

17. The apparatus of claim 12 wherein said frame means is rectangular, said weir extending between opposite sides of said frame means, said septum extending between said weir and one end of said frame means, said collection chamber extending between said weir and the other end of said frame means.

18. The apparatus of claim 17 wherein said collection chamber includes an imperforate plate cooperating with said weir and the other end of said frame means to provide said collection chamber.

19. The apparatus of claim 18 including duct means communicating with said collection chamber to discharge water from said collection chamber remotely from the body of water on which said apparatus is floated.

20. A tertiary water treatment facility comprising means providing a pond to receive secondarily treated water, an upflow clarifier septum, a weir adjacent an edge of said septum, collection means separated from said septum by said weir, buoyant frame means surrounding the septum, weir, and collection means, said frame means floating on the surface of said pond and supporting said weir below the surface of the surrounding water in said pond, said frame means supporting said septum below said weir whereby the surrounding water drives water underlying said septum upwardly through said septum and over said weir to said collection means, and decant means communicating with said collection means to drain water from said collection means remotely from said pond.

21. The treatment facility of claim 20 wherein said clarifier septum is a foraminous blanket inducing septum, said buoyant frame means including a flotation chamber having communication with water in said pond, said facility including fluid pressure means to displace water from said flotation chamber and thereby elevate the position at which said frame means normally floats on said pond thus raising said septum through blanket material that may form thereabove.

22. The treatment facility of claim 20 wherein said buoyant frame means comprises a breakwater shielding said septum, weir, and collection means from an overflow of water from said pond.

23. The method of claim 1 wherein said clarifier means comprises a foraminous blanket inducing septum disposed below the level at which water is decanted and including the step of elevating the level at which said clarifier means is floated to lift said septum through blanket material accumulated thereabove.

24. Water treatment apparatus comprising, in combination, annular duct means having spaced apart end portions, upward flow clarifier means disposed within said duct means and spaced from one end portion thereof, said clarifier means comprising means defining a chamber within said duct means, said chamber having wall means diverging from a first opening at one end of said chamber to a larger opening at an opposite end of said chamber, buoyant means attached to said duct means and adapted to float said duct means on a body of water, said buoyant means adapted, when floating said duct means, to support said duct means with the other end of said duct means and said clarifier means disposed below the level of surrounding water, said wall means diverging in the direction of said one end portion of said duct means, and decant means adapted, when said duct means is floated, to remove water upflowing said duct means at a level above said clarifier means and below the level of the surrounding water.

25. The apparatus of claim 24 wherein said means defining a chamber comprises an annulus received within said duct means, said diverging wall means comprising the interior wall of said annulus.

26. Water treatment apparatus comprising, in combination, a duct having spaced apart end portions and having walls diverging from a first opening at one end portion of said duct to a larger opening at the opposite end portion of said duct, buoyant means attached to said duct and adapted to float said duct on a body of water, said buoyant means adapted, when floating said duct, to support said duct with said one end portion disposed below the level of surrounding water, and means for removing water upflowing said duct at a level above said one end portion and below the level of the surrounding water.

* * * * *

UNITED STATES PATENT OFFICE
CERTIFICATE OF CORRECTION

PATENT NO. : 3,923,649
DATED : December 2, 1975
INVENTOR(S) : Vaughan R. Sparham and Leon C. Bixby It is certified that error appears in the above-identified patent and that said Letters Patent are hereby corrected as shown below:

In the Abstract, line 9, "emabling" should be --enabling--.

Column 6, line 17, "frames" should be --frame--.

Column 10, line 21, "1" should be --3--.

Column 10, line 28, "1" should be --3--.

Column 10, line 31, "1" should be --3--.

Column 10, line 38, "1" should be --3--.

Column 10, line 48, "1" should be --3--.

Column 10, line 52, "1" should be --3--.

Signed and Sealed this ninth Day of March 1976

[SEAL]

Attest:

RUTH C. MASON
Attesting Officer

C. MARSHALL DANN
Commissioner of Patents and Trademarks